2 Sheets—Sheet 1.
C. W. & E. A. JONES.
EVAPORATOR FOR DRYING ANIMAL AND VEGETABLE SUBSTANCES.
No. 173,016. Patented Feb. 1, 1876.
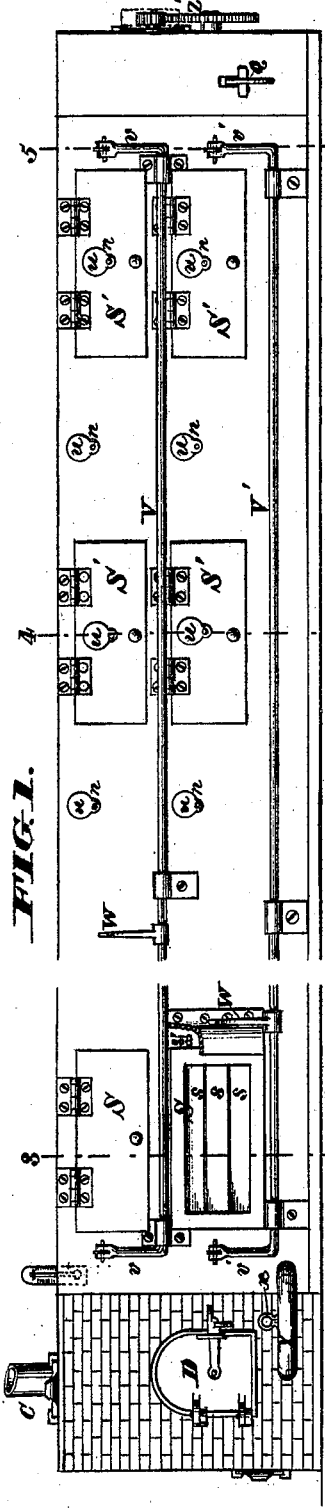
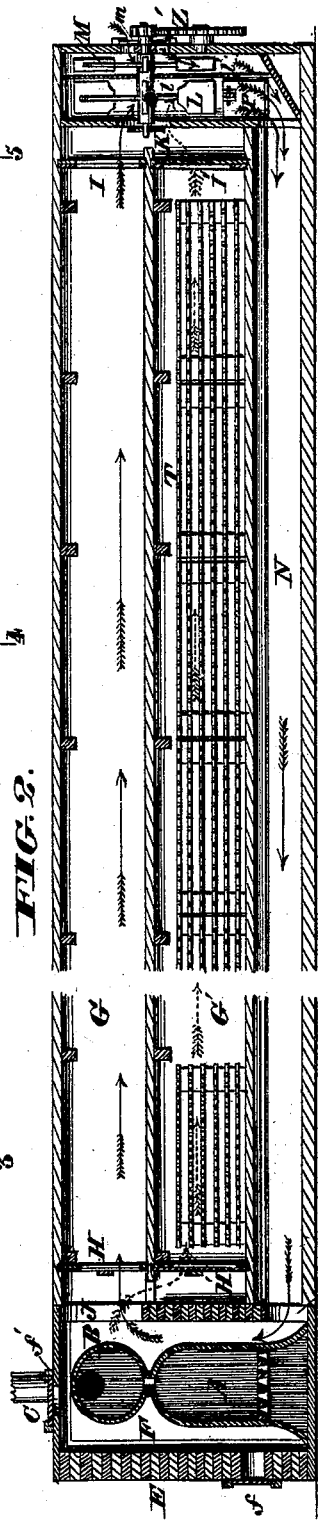
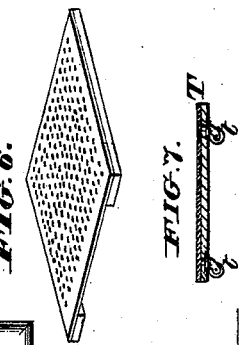
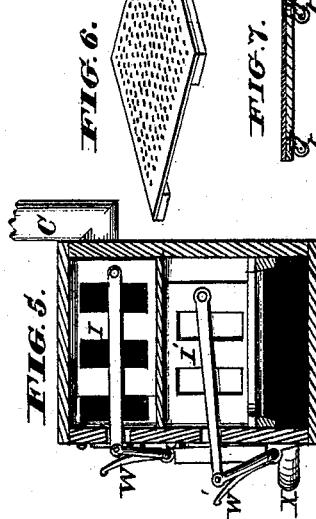
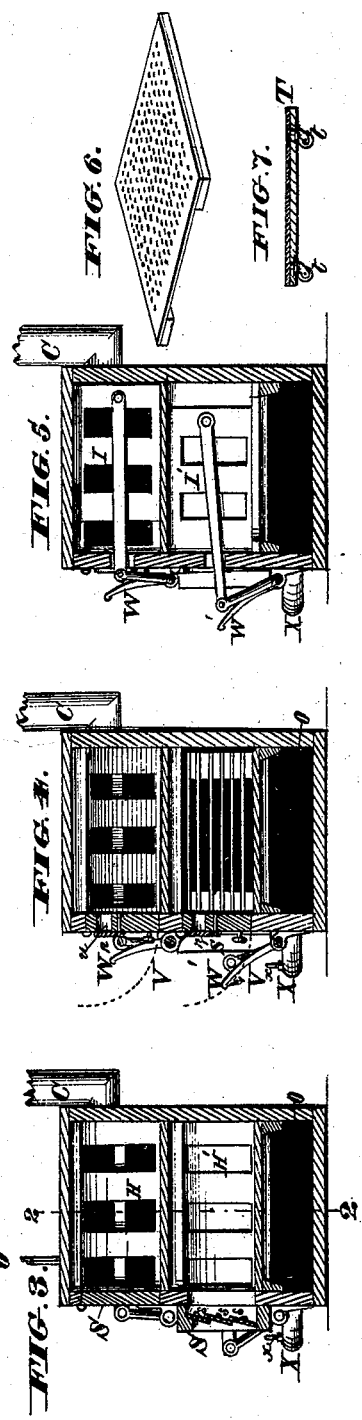
WITNESSES
Chas. Hooch
Alex Hyatt
INVENTORS
Charles W. Jones.
Edgar A. Jones.
By Knight Bros. Attorneys
N. PETERS, PHOTO-LITHOGRAPHER, WASHINGTON, D.C.

C. W. & E. A. JONES.
EVAPORATOR FOR DRYING ANIMAL AND VEGETABLE SUBSTANCES.
No. 173,016. Patented Feb. 1, 1876.
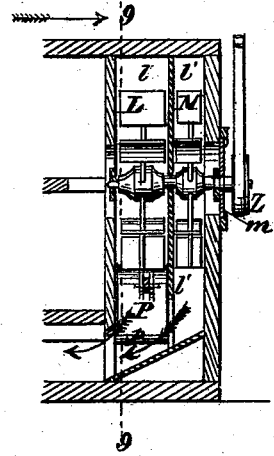
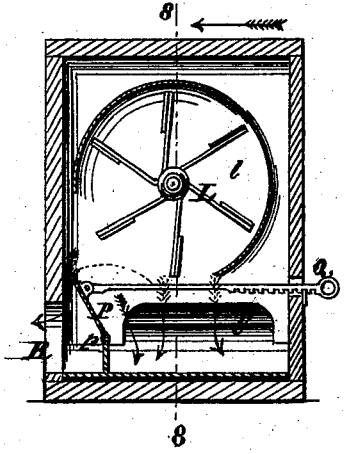
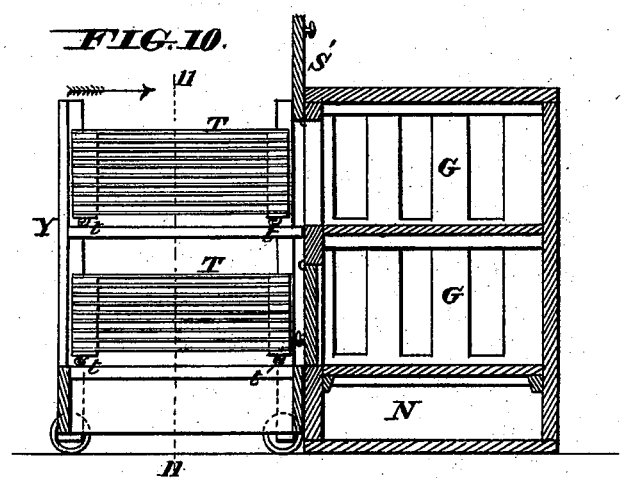
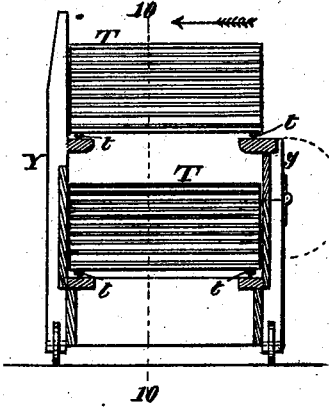
WITNESSES
Chas. J. Gooch
Alex H. Galt
INVENTORS
Charles W. Jones
Edgar A. Jones
By Knight Bros, Attorneys

UNITED STATES PATENT OFFICE.

CHARLES W. JONES, OF CENTREVILLE, AND EDGAR A. JONES, OF STURGIS, MICHIGAN.

IMPROVEMENT IN EVAPORATORS FOR DRYING ANIMAL AND VEGETABLE SUBSTANCES.

Specification forming part of Letters Patent No. 173,016, dated February 1, 1876; application filed November 10, 1875.

*To all whom it may concern:*

Be it known that we, CHARLES W. JONES, of Centreville, and EDGAR A. JONES, of Sturgis, both in the county of St. Joseph and State of Michigan, have invented a certain new and useful Process and Apparatus for Evaporating Fruit, Vegetables, and other matters; and we hereby declare the following to be a specification thereof.

The object of our invention is the construction of an improved evaporator for drying vegetable and animal substances by artificial heat combined with strong or forcible air-currents, which greatly facilitate the drying process. For this purpose we use the combination of a hot-air furnace, a drying flue or flues to contain the article in process of evaporation, and a rotating fan, or its equivalent, for forcing or drawing the heated air rapidly through the drying-compartments.

We find the simplest and most desirable way to effect this combined object is to conveniently locate a hot-air furnace of suitable capacity, by the side of which is constructed a drying flue or flues in connection with a return-flue, as hereinafter specified. These drying-compartments may be of considerable length, and of sufficient capacity to hold any desired amount. One end of them is connected with the heating-chamber of the furnace, and the other end with an exhaust-fan, which may be rotated by hand, or by a belt from any convenient line of shafting, for the purpose of producing a strong current of heated air through the drying-compartments. In the discharge-pipe of the fan is placed an adjustable valve, which can be arranged to throw the air-currents, or any part of them, into the open air, or back through the return-flue into the heating-chamber of the furnace, thereby effecting a great saving of heat.

Although, by the use of our rapid and forcible air-current, we are enabled, in an ordinary-sized evaporator, to pass the same heated air many times through the drying-compartments, it is obvious that in time it will absorb all the moisture it can profitably carry, and requires to be discharged and its place supplied with fresh air. We have previously accomplished this with the one large fan, but find it an improvement to use a second smaller one to force as much fresh air into the furnace-chamber as is thrown out of the evaporator by the larger fan. For this purpose two independent fans may be used; but the cheaper and more desirable method is to place both fans on the same shaft, with a division between them—the one arranged for drawing or forcing the heated air rapidly through the drying-compartments, and thence into the open air, or back to air-chamber of the furnace, according to the position of the adjustable valve for that purpose, the other for taking fresh air from the outside and discharging it into the furnace-chamber, as hereinbefore described.

Each of the drying-compartments is provided, near its respective ends, with sectional gates or valves, connected by a rod, so as to open and close simultaneously, whereby the powerful air-currents are controlled or shut entirely off at will. The compartments are also provided with doors at suitable places, for the introduction or removal of the articles being treated, and with hand-holes that can readily be opened to facilitate the examination of the same.

To give a better and quicker control of the degree of heat required, we connect the return flue or heating-chamber of the furnace with the fire-box by a pipe several inches in diameter, in which is placed a valve or damper to control the flow of air into the fire, or shut it off entirely, the fan thus accomplishing the two important results of producing a forcible current of heated air through the drying-compartments, thereby hastening the evaporation, and obviating the danger of burning or scorching, (so common in all driers depending on a natural air-current,) and also for forcing the fire when it is desirable to do so.

To prevent too high an accumulation of heat in the furnace, when, from any cause, it may be necessary to stop the fan, we provide a valve near the bottom of the heating-chamber of the furnace for the admission of cold air, and another at or near the top for the escape of the surplus heat, these valves being closed when operating the fan.

In drying fruit and vegetables we use a series of frames as large as is convenient to handle, which are covered with netting or other suitable material to hold the fruit. These trays are placed one above another in series of ten, (more or less,) and so constructed as to leave spaces between them for the air-currents lengthwise of the flues.

Some kinds of fruit, particularly apples, require to be placed in a strong heat as soon as possible after being cut, to prevent discoloration and damage. For this purpose we use a door made of slats, that tip inward by a pressure from the outside, and close with a spring as soon as a tray is inserted. This arrangement obviates opening a large aperture in the drying-flue, or shutting off the air-currents when introducing the fruit. The slat-door, being made with an independent frame, can be opened bodily on hinges or readily taken off, and its place supplied by a tight door when drying any articles where it is more convenient to insert a series of the frames at once.

In the accompanying drawings, Figure 1 is a side elevation of an evaporator illustrating the invention, the middle portion being omitted. Fig. 2 is a vertical longitudinal section of the same on the line 2 2, Fig. 3. Fig. 3 is a vertical transverse section on the line 3 3, Fig. 1. Fig. 4 is a vertical transverse section on the line 4 4, Fig. 1. Fig. 5 is a vertical transverse section on the line 5 5, Fig. 1. Fig. 6 is a perspective view of a drying-tray. Fig. 7 is a vertical section of a tray mounted on caster-wheels. Fig. 8 is a vertical longitudinal section of the fan-case on a larger scale. Fig. 9 is a transverse section of the same on the line 9 9, Fig. 8. Fig. 10 represents a vertical section of the flues and a double-decked car, adapted for carrying the trays to and from either flue. The line 10 10, Fig. 11, indicates the plane of section. Fig. 11 is a vertical section of the car on the line 11 11, Fig. 10.

A may represent the fire-chamber, B the heating-drum, C the smoke-discharge flue, and D the fire-door, of a heating-furnace of any suitable construction, the external walls E of which inclose a hot-air chamber, F. $ff'$ represent dampers, which are opened to permit a free passage of air through the chamber F when the evaporating-flues are not in use or when it is not desired to carry the heated air through the said flues. G and G' represent two similar horizontal flues, placed one above the other, each of which is provided at the end next the furnace with an inlet-valve, H H', and at the end away from the furnace with an outlet-valve, I I'. The said flues, when the valves are open, receive the heated air through a common opening, J, from the furnace, and discharge it through a common opening, K, into the chamber $l$ of a fan, L, by which the air is forcibly driven through the return flue N, opening O, and heating-chamber F. P represents a valve, fulcrumed at $p$, and operated by a notched rod, Q, adapted to fix the said valve in any position, so that the whole of the air forced by the fan L may be returned through the flue N, or any desired part of it may be discharged through an opening, R, to the outer air, as illustrated in Fig. 9. M represents a supplemental fan, preferably mounted on the same shaft as the fan L, and employed to take external air through an opening controlled by a valve, $m$, and force it into the return flue N, so as to introduce any required amount of fresh air into the circulation of the evaporator.

The drawings show the upper trunk G empty, but open for the passage of air, and the lower trunk G' supplied with trays and with the valves closed as when the trays are being introduced or removed.

In practice the apparatus is usually of greater proportional length than is here represented. It is provided near one end with any desirable number of doors or shutters, S S', the former for the introduction of fruit or other matter to be dried, and the latter for its removal when done. One or more of the inlet-doors S are constructed with slats $s$ turning on central pivots and held shut by springs $s'$ to admit of slipping in trays singly without opening the entire door. T are the trays for receiving the material to be dried. These are employed in sets of ten, more or less, one above another, as above explained, the lower tray being provided with caster-wheels $t$ to facilitate the introduction of the entire set and their movement within the flues, which is readily accomplished from the apertures where they are introduced. U represents hand-holes covered by shutters $n$, and employed to admit the hand of the operator for the purpose of inspecting the condition of the material as the work progresses. V V' represent shafts terminating in vertical arms $v$ $v'$, and operated by lever-arms W W' for the purpose of simultaneously opening or closing the valves H and I or H' I' at the receiving and discharging end. X is a connecting-pipe, controlled by a damper, $x$, for the purpose of conveying any necessary amount of air from the flue N into the furnace in order to force the fire. This object can be accomplished by a connection in any position or by a simple opening in the furnace-wall, controlled by a damper to admit air from the surrounding space where pressure exists.

In operating the evaporator with any substance that will bear exposure to the air a short time, we have a car, Y, Figs. 10 and 11, to run on the floor, arranged to hold a series of frames, and of proper height to correspond with the height of the drying flue or flues, a hinged shelf, $y$, being provided to support the upper set, and capable of being turned down out of the way when the lower set is to be introduced. This car being filled, the valves of the flue are closed, the door in the side at the end next to the furnace opened, the loaded car run up, and the series of fruit-frames which are on casters run into the drying-flue, the door of which is then closed, the valves opened, and the contents of the frames subjected to the strong heat directly from the furnace while another series of frames are made ready. The first series are now pushed along to make room for the second series, which, in their turn, are subjected to the higher temperature, to be, in turn, moved into a lower temperature when partially evaporated. This process is repeated until the compartment is full, when the trays are drawn out upon another car near the opposite end as fast as new ones are inserted.

The drying flue or flues are provided with a thermometer near the furnace to show the degree of heat, and the whole arrangement, being on one floor, saves much expense in building, and makes it practicable for one person to superintend the whole operation.

While showing and describing our evaporator as made with horizontal drying-flues, we do not intend to imply that it is essential to the invention that they shall be precisely horizontal. We mean by the term "horizontal flue" one in which air-currents carried longitudinally through the flue will flow edgewise to the trays resting within it, in contradistinction to a vertical flue, in which air-currents move perpendicularly to or through the screens or trays.

In some cases it might be desired to place the furnace in the basement below, and, perhaps, incline the evaporator. We do not, therefore, confine ourselves to a precisely-horizontal construction of the same, but usually prefer it, on account of greater convenience in operating and cheapness in construction of both the evaporator and building.

The fan may be driven by a band and pulley, L, or by gearing L', or by any other suitable means.

This new evaporator bears the merit of having been thoroughly tested on a large scale and its very satisfactory working fully demonstrated previous to applying for this patent.

We are aware that horizontal drying-tunnels, having some general resemblance, but depending on a natural current the reverse of ours, have been used, and such we do not claim; but What we do claim as our invention, and desire to secure by Letters Patent, is—

1. An evaporator for drying vegetable and animal substances, combining one or more flues, horizontal, or nearly so, with a set of trays or screens movable edgewise within the flue, for holding the articles to be dried, together with an air-forcing appliance for producing a continuous current of air edgewise of the screens, substantially as described.

2. An evaporator for drying vegetable or animal substances, constructed with one or more flues or compartments, a series of trays movable edgewise along the said flue or flues, and a heating-furnace and a blower and connections, operating, substantially as set forth, to produce a forced current of air through the apparatus longitudinally of the flues and edgewise of the trays.

3. The combination, with one or more drying-flues, of the adjustable gates, at or near each end of said flues, operated simultaneously by a connection for controlling or shutting off the forcible air-currents, substantially as described.

4. The combination of a heating-furnace, a hot-air chamber, one or more evaporating-flues or compartments, an air-forcing appliance for producing a circulation through said heating and evaporating chambers, and an aperture or pipe, controlled by a valve, to admit a forcible current of air to the fire from the chamber or passage through which air is forced, substantially as described.

5. The combination, in an evaporator for drying vegetable or animal substances, of two fans, one for causing a continuous forced circulation of air through the evaporator, and the other for introducing fresh air into the said circulation, as set forth.

6. The combination of two fans on one shaft, with a division between them, one being arranged to cause a forcible current of air through the drying-flues, and the other for introducing fresh air into the evaporator, substantially as described.

7. The combination, with a drying-flue, of the door S, constructed to open bodily for the passage of a nest or stack of trays, and with spring-slats $s$ $s$ to permit the passage of single trays, as explained.

8. The combination, with a two-story evaporator, of the double-decked car, constructed, substantially as set forth, with a hinged section, to adapt it to supply trays to either evaporating-chamber at will, or take them therefrom.

In testimony of which invention we hereunto set our hands this 3d day of November, 1875.

CHARLES W. JONES.
EDGAR A. JONES.

Witnesses to the signature of CHARLES W. JONES:
  H. HINKLEY,
  A. B. DUNNING.

Witnesses to the signature of EDGAR A. JONES:
  OCTAVIUS KNIGHT,
  ALEX. H. GALT.